United States Patent [19]
Lewicki, Jr.

[11] 3,953,639
[45] Apr. 27, 1976

[54] MECHANICALLY EMBOSSED RESILIENT LAMINAR FLOOR MATERIAL

[75] Inventor: Walter J. Lewicki, Jr., Lancaster, Pa.

[73] Assignee: Armstrong Cork Company, Lancaster, Pa.

[22] Filed: Nov. 18, 1974

[21] Appl. No.: 524,523

Related U.S. Application Data

[62] Division of Ser. No. 442,770, Feb. 15, 1974, Pat. No. 3,887,678.

[52] U.S. Cl. ............................... 428/160; 428/159
[51] Int. Cl.² ........................................ B32B 3/26
[58] Field of Search .................... 428/158–160, 423; 156/209, 219, 226, 282; 264/321

[56] References Cited
UNITED STATES PATENTS

| | | | |
|---|---|---|---|
| 3,196,062 | 7/1965 | Kristal | 156/209 |
| 3,239,365 | 3/1966 | Petry | 428/159 |
| 3,293,094 | 12/1966 | Nairn et al. | 428/158 |
| 3,365,353 | 1/1968 | Witman | 428/159 |
| 3,399,106 | 8/1968 | Rilmen et al. | 428/159 |
| 3,428,609 | 2/1969 | Chilvers et al. | 428/423 |
| 3,741,851 | 6/1973 | Erb et al. | 156/220 |
| 3,773,545 | 11/1973 | Erb et al. | 156/209 |

Primary Examiner—George F. Lesmes
Assistant Examiner—Stanley S. Silverman

[57] ABSTRACT

A process for forming an embossed surface on a laminar floor material which has at least one foam layer. A floor material is formed consisting of a wear layer joined with an expanded foam cushion backing. The floor material is heated rapidly by a high temperature, hot air heater so that primarily the wear layer is heated with very little heating of the cushion backing. The floor material passes between an embossing roll and a back-up roll where the embossing roll engages the surface of the heated vinyl wear layer in proper registration with a printed pattern therebelow. The floor material is cooled and the resultant product has an embossed wear layer with the cushion backing thereunder retaining a substantial portion of its original resiliency.

2 Claims, 2 Drawing Figures

U.S. Patent April 27, 1976 3,953,639
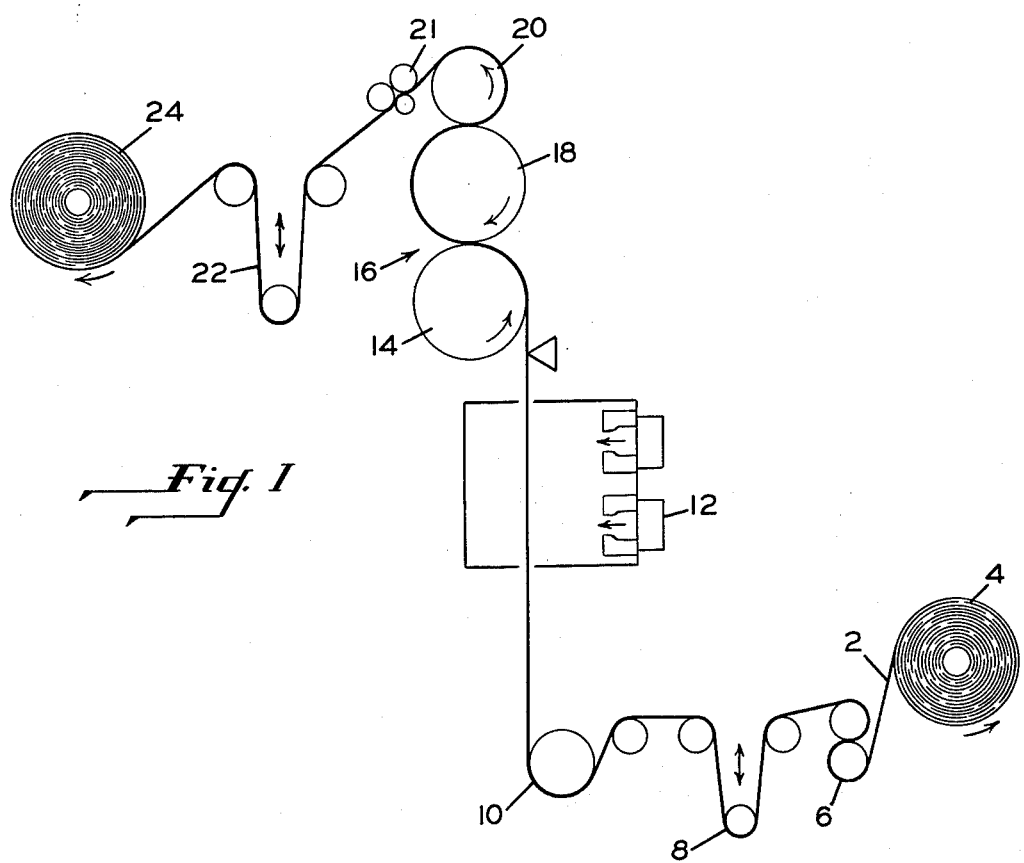
*Fig. I*
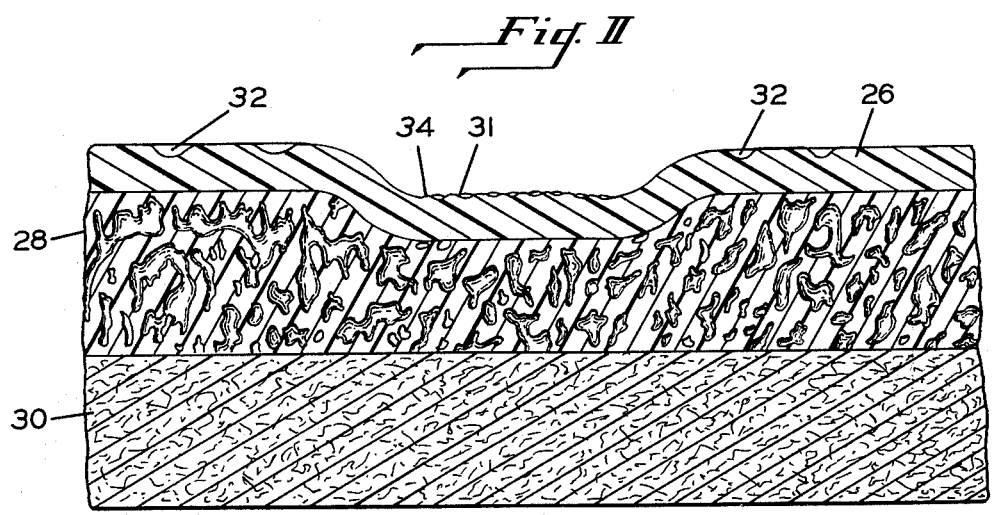
*Fig. II*

MECHANICALLY EMBOSSED RESILIENT LAMINAR FLOOR MATERIAL

CROSS REFERENCE TO RELATED APPLICATION

This is a division of application Ser. No. 442,770, filed Feb. 15, 1974, now U.S. Pat. No. 3,887,678.

BACKGROUND OF THE INVENTION

1. Field of the Invention

The invention relates to a floor material and, more particularly, to an embossed floor material made with a resilient foam backing.

2. Description of the Prior Art

Typically, floor covering material has been embossed in the manner set forth in U.S. Pat. No. 3,196,030. Herein a foam flooring is provided with a wear layer, and the resultant floor is provided with an embossed pattern. No attempts were made to secure registration between a printed pattern on the wear layer and the embossed pattern which is applied to the wear layer.

U.S. Pat. No. 3,365,353 discloses a current commercial technique for securing foam floor material with registration between the embossed pattern and the printed pattern on the floor material. The actual embossing is not carried out by a mechanical embossing, but is carried out by a chemical embossing operation.

U.S. Pat. No. 3,655,312 is one of the first attempts at carrying out a mechanical embossing process wherein there is secured a good degree of registration between the embossing and printing comparable to that set forth in U.S. Pat. No. 3,365,353. Embossing is carried out on a heated floor material and registration is maintained between the embossing and a printed pattern on the floor material. The problem with the technique of the latter-mentioned patent is that the embossing is carried out in such a manner that the foam backing has its resiliency destroyed in the embossed areas and also the embossing is carried out without the bottoming out of the embossing roll. This means that the raised areas of the embossed product are without surface design indentations and textures or finishes caused by the embossing roll.

The inventive process herein is designed to overcome the deficiencies of U.S. Pat. No. 3,655,312 while at the same time improving the registration between a printed pattern and embossing. This improved registration is secured because the inventive process herein has the backing at a much lower operational temperature than the process of U.S. Pat. No. 3,655,312 where the backing material is at about the same temperature as the material to be embossed. The difference in backing temperature means that the backing containing the higher temperature may elongate under varying line tensions to a much greater degree and cause more registration problems.

SUMMARY OF THE INVENTION

A strip of floor covering material is formed with a vinyl or like wear layer and a layer of an expanded foam cushion material. This composite material is unrolld from a roll and passed through an appropriate slack take-up structure to a guider structure which guides the strip of floor covering material in a transverse direction relative to its path of travel. The floor material strip then passed on to a high temperature, hot air heater which heats the wear layer surface to a temperature approximately 100° F. greater than that of the foam cushion backing material. The heated strip immediately passes to an embossing roll. The embossing roll has a pattern which is approximately the same repeat length as a pattern which has been printed on the strip floor material. By visual or automatic control, an operator maintains the embossed pattern in register with the printed pattern on the wear layer. The embossing roll completely bottoms out on the wear layer and the material is actually wrapped partly around the embossing roll to cool the wear layer and set the embossed pattern. The strip of floor material then passes around another slack take-up mechanism and through other cooling apparatus until it is finally rewound on a rewinder roll.

The product formed thereby is provided with an embossed surface which is in registration with the printed pattern adjacent the wear layer. In addition, the embossing in the wear layer has been carried out with some indenting of the foam backing, but without the rupture of the cells of the underlying foam backing so that the foam backing will still maintain its resiliency in the areas of the embossment.

BRIEF DESCRIPTION OF THE DRAWING

FIG. I is a schematic view of the process for carrying out the inventive technique herein; and FIG. II is a cross-sectional view of a flooring material formed by utilizing the inventive process herein.

DESCRIPTION OF THE PREFERRED EMBODIMENT

The sheet floor material to be embossed contains normally a wear layer surface, an intermediate foam layer and a backing. The floor material is formed from the same materials and in the same manner as set forth in U.S. Pat. No 3,365,353 except for the fact that the ink which places the printed design on the sheet does not contain a polymerization catalyst and the foam does not contain a polymerizable monomer. Consequently, when this catalyst and monomer are omitted from the materials of the above-mentioned patent, there will be formed a fully foamed product with no depressed, unfoamed regions. This material will then be utilized in the inventive process herein and will be embossed by the technique below-defined.

EXAMPLE 1

The following plastisol was prepared by thoroughly mixing the following ingredients:

| Formula 1A | |
|---|---|
| Ingredients | Parts by Wgt. |
| Poly(vinyl chloride) | 100 |
| Dioctyl Phthalate (Plasticizer) | 49.55 |
| Octyl Epoxy Tallate (Stabilizer) | 5.0 |
| Titanium Dioxide | 3.6 |
| Azodicarbonamide (Blowing Agent) | 2.3 |
| Talc | 0.6 |
| Zinc Octoate (Blowing Agent Activator) | 1.95 |

The above plastisol was applied on a coated beater-saturated asbestos sheet having a thickness of 0.303 inch. The plastisol was applied with a reverse roll coater in a wet thickness of 10 mils. The plastisol-coated backing was gelled in a hot-air oven for one minute to an exit temperature of 270° F.

Inks were prepared by thoroughly mixing the following ingredients:

| Formula 1B | |
|---|---|
| Ingredients | Parts by Wgt. |
| Vinyl Binder | 33.0 |
| Pigment | 12.8 |
| Cellosolve Acetate | 1.6 |
| 2-Nitropropane | 50.0 |
| Isopropyl Acetate | 1.0 |
| Alkyl alcohol aryl polyether, Triton X-100 nonionic (Wetting Agent) | 1.0 |

Inks of various colors based on this formula were applied to the gelled plastisol sheet described above utilizing the printing cylinders of a conventional rotogravure printing press. The printing cylinders were run in a normal manner producing a design that was printed-in-register. The inks were dried by subjecting the printed sheet to warm air impingement supplied by the enclosed drying zones of the press.

A plastisol wear layer having the following formula was prepared:

| Formula 1C | |
|---|---|
| Ingredients | Parts by Wgt. |
| Poly(vinyl chloride) | 100 |
| Dioctyl Phthalate (Plasticizer) | 12 |
| 2,2-4-Trimethyl-1,3-Pentadiol Monoisobutyrate, Nuoplaz 1046, Nuodex Inc. (Nonstaining Plasticizer) | 27 |
| Barium-Cadmium-Zinc Phosphite (Stabilizer) | 3 |
| 2,2,4-Trimethyl-1,3-Pentadiol Diisobutyrate | 5 |
| Optical Brightener | 0.005 |

The above plastisol was supplied as a final coat to the printed sheet at a wet film thickness of 10 mils. This final coated sheet was fused and the 10 mil printed gel (Formula 1A) chemically expanded to a uniform thickness of 0.035 inches consisting of a homogeneous cellular structure. Fusion and foam expansion were carried out in a hot-air oven maintained at 425° F. for 1 minute. The fused and expanded structure was cooled to room temperature and rerolled.

Referring now to FIG. I, there is shown a schematic view of the process for embossing the above-described sheet material 2 to place an embossed pattern thereon in registry with the printed design on the sheet. The sheet material 2 is removed from an appropriate unwind roll 4 and fed past a pinch roll structure 6, which is nothing more than the feed structure for pulling the sheet material off the unwind roll and pushing it partly through the processing operation. The sheet material then passes through a dancer roll structure 8 which is conventional in the art and simply functions to take up slack in the feed of the sheet material 2 and aids in tension control. The sheet material 2 then passes around an appropriate guider structure 10, which simply maintains the registry of the sheet material in a direction transverse to the direction of sheet movement. The transverse guiding of the sheet could be carried out with a structure as simple as a guide edge or could even be carried out with a "Kamberoller" which is a commercially available structure involving an angled guide roll on a carriage mounted for transverse movement. Registry along the machine direction or in the direction longitudinally of the sheet movement is maintained in the same manner as set forth in U.S. Pat. No. 3,655,312, column 5, line 53, to column 6, line 43. The technique of U.S. Pat. No. 3,694,634 can be adopted herein for machine direction registry. Finally, registry can be secured using Model R-500 Digital Control and Model R-425-1 Feathering Drive Control System of Registron Division of Bobst Champlain, Inc.

The sheet material then passes by a high temperature heater 12 which will rapidly heat the surface of the sheet material 2, but not heat the total sheet thickness to a uniform temperature. A particularly useful heater is the "Blu-Surf" burner, which is sold by the Blu-Surf Division of Hayes-Albion Corporation of Parma, Michigan. This is a burner structure which operates with a very short flame coming off an air-gas manifold. The hot gases from the flame are directed by a nozzle structure towards the wear layer of the sheet material 2. The sheet material is moved at approximately 200 feet per minute past two heaters which are spaced approximately 12 inches from the wear layer surface. The length of the enclosed heating area is only about 40 inches, and the heaters put out approximately 10,000–14,000 Btu's per square inch per hour. During the short time (approximately 1 second) that the sheet material 2 passes by the heaters, the surface of the wear layer facing the heaters is heated to about 320° F. It is known that the above heating can be carried out at a temperature range of 250° to 350° F. for a time span of about 0.6 to 6 seconds to secure the desired results. The wear layer is approximately 10 mils thick. At the interface between the wear layer and the intermediate foam layer, the temperature is only about 220° F. At the interface between the intermediate foam layer and the backing, the temperature is approximately 150° to 170° F. The foam layer is approximately 35 mils thick. The backing is approximately 30 mils thick, and on the back side of the backing at the point farthest from the heaters, the temperature is only about 150° F. The sheet material 2 is moved from the heaters 12 directly to a rubber back-up roll 14 of the embossing structure 16. The embossing roll 18 is a steel roll with the appropriate embossing pattern thereon. Both the rubber back-up roll and the embossing roll are approximately 36 to 40 inches in circumference. The embossing roll is a cooled roll, and when in operation with the sheet material 2 thereagainst, it is operated at a surface temperature of about 120°F. or below. The nip between the embossing roll and the back-up roll ranges from zero to 10 plus mils. This distance is measured from the raised area of the embossing roll to the surface of the rubber roll. The important point is that "bottoming out" is secured with the nip setting used. With the embossing roll being provided with an embossed pattern of 25 to 30 mils depth, it is possible to provide an embossed pattern in the vinyl wear layer of about 10 to 12 mils in depth. The heated sheet material 2 moves directly from the heaters into the nip of the embossing roll and its backup roll. The embossed surface of the embossing roll engages the wear layer surface of the sheet material. The embossing roll completely bottoms out against the wear layer surface. That is, not only the raised areas, but also the depressed areas of the embossed pattern on the embossing roll engage the wear layer of the sheet material. Consequently, not only do the raised areas of the embossing roll provide a pattern effect on the wear layer, but the depressed areas of the embossing roll are also capable of providing a pattern effect to the wear layer of the sheet material. The sheet material passes around approximately 180° of the circumference of the embossing roll. By the time the sheet material 2 is able to leave the embossing roll, it has cooled to about 220°F. on the surface of the vinyl wear layer. The sheet material is then passed around a second cooled roll 20 and by additional cooling means 21 which further cool the sheet material.

The material then passes on to a dancer structure 22 which takes up any slack in the process line. At about this point, the sheet material has been cooled to approximately 75°–100°F. The sheet material is then rewound on an appropriate rewind structure 24.

As a result of passing the sheet material 2 through the above-described process, there is formed a floor covering material with a cross section such as that shown in FIG. II. Therein is shown the wear layer 26, the intermediate foam layer 28 and the backing layer 30. As was indicated above, these structures are exactly the same as that shown for the foamed regions of U.S. Pat. No. 3,365,353. In the middle of the FIG. II cross-sectional view, there is shown a region 31 which has been deeply mechanically embossed. It will be noted that the wear layer has been depressed in that area below the normal plane of the wear layer surface. In the region below the depressed wear layer surface, the foam material still retains its cellular structure. However, the cell structure has been somewhat compressed and reduced in size. The backing layer appears to be unaffected by the embossing operation. Should this particular sheet material be heated again, the stress in the wear layer as a result of the mechanical embossing will be relieved. The foam cells will have sufficient resiliency so that they will cause the sheet material to return to its regular configuration. That is, heating of the foam material will cause the depressed areas of the sheet to raise up back to their normal position, and consequently, the sheet material will appear as an unembossed flooring material. This is not possible with the mechanical embossing technique set forth in the above-mentioned U.S. Pat. No. 3,655,312 or the chemical embossing technique set forth in above-mentioned U.S. Pat. No. 3,365,353. This is a clear indication that the foam material under the embossed regions made by the inventive technique herein has had the foam regions unaffected or virtually undamaged by the embossing operation. Consequently, these regions still have a substantial degree of resiliency. Due to the fact that the embossing roll is able to completely bottom out during the embossing operation, it is possible to perform a surface texturing 32 to the raised areas to the extent of anywhere from zero to 7 mils while the embossed areas 31 could be in the region of 10 to 12 mils in depth. Also, a matte finish and/or other minute texture can be applied to portions of the embossed material, such as texturing 34 in area 31. It is obvious that other backing materials, foam and wear layer materials can be used.

EXAMPLE 2

Example 1 was repeated with the application of plastisol Formula 1A at separate thicknesses of 16 and 25 mils. Material coated at each thickness was gelled, cooled, and printed in similar manner. Twelve mils of Formula 1C was applied to the 16 mil gelled layer and fused, with subsequent chemical blowing of the gel to 0.060 inch. Fourteen mils of Formula 1C was applied to the 25 mil gelled layer and fused, with the simultaneous expansion of this gel to 0.090 inch. After cooling, rolls of both materials were processed under conditions of Example 1, with the nip between the embossing roll and the back-up roll set at 15 plus mils. Complete "bottoming out" was secured with this nip setting used.

The final products contained wear layers which were embossed with surface textures and mortar line areas that were similar to the results of Example 1.

EXAMPLE 3

An organosol having the following formula was prepared:

| Ingredients | Parts by Wgt. |
| --- | --- |
| Poly(vinyl chloride) | 100 |
| Dioctyl Phthalate | 25 |
| Epoxidized Soya Oil | 4.5 |
| Barium-Cadmium Phosphite and Calcium-Zinc Soaps | 3 |
| Polyethylene Glycol Monolaurate | 2 |
| Mineral Spirits: Aliphatic Hydrocarbon Fraction (Solvesso 150), 3:1 | 12 |

The organosol was applied at 7 mils thickness as a final coat to a sheet printed as in Example 1. Expansion was carried out in the same manner as in Example 1. An embossed sheet completely in-register with the print and having a high gloss wear layer resulted as with the poly(vinyl chloride) wear layer of Example 1.

EXAMPLE 4

Example 1 was repeated wherein a clear 2 mil (dry) coating of a curable polyurethane was applied to the 10-mil fused plastisol wear layer. The coating was applied from a 55:45 xylene/resin solution containing catalyst, which in combination with 270°F. heat, cured the polyurethane in 3 minutes time.

A co-embossed sheet resulted as with the poly(vinyl chloride) wear layer of Example 1, having differential gloss features and an improved wear surface.

EXAMPLE 5

A mechanically frothed foam havng the following formula was prepared:

| Ingredients | Parts |
| --- | --- |
| Poly(vinyl chloride) Dispersion Grade | 47 |
| Poly(vinyl chloride) Blending Grade | 26 |
| Dioctyl Phthalate | 50 |
| Tin Maleate (Stabilizer) | 5 |
| GE 4254 Silicone (frothing agent) | 3 |

Example 1 was repeated wherein the vinyl froth foam prepared in an Oakes foamer was applied to the coated web by a knife blade coater. The 0.035 inch foam was fused. The inks were printed and dried in the conventional manner. After cooling, the plastisol wear layer (Formula 1C) was applied at 10 mils and fused according to Example 1. Following similar mechanical embossing procedures of Example 1, a multilevel embossed wear layer was produced in-register with the print.

EXAMPLE 6

Example 5 was repeated wherein the vinyl froth foam was applied at 0.045 inch thickness on to a high temperature binder saturated nonwoven carrier. The carrier had an original thickness of 0.020 inch and consisted mainly of inorganic fibers. An embossed sheet resulted, having embossing depth and detail comparable to the material made utilizing the coated beater saturated asbestos sheet backing of Examples 5 and 1.

All of the above cited examples were processed continuously from 100–200 lineal yard rolls of material under conditions similar to those listed in Example 1. It was firmly established that primarily the wear layer surface is heated with very little heating of the intermediate cushion layer or backing. The process herein was found to be independent of the type of vinyl foam (chemical and mechanical), its thickness, and the backing to which it was applied. Since the wear layer and foam layer interface do not approach a temperature that would activate residual blowing agent or would melt the resinous cellular structure of the foams, this invention was also found to be applicable to foams based on resins other than poly(vinyl chloride).

In order to demonstrate this capability, hand samples of various embossed vinyl and foam wear layer combinations were made utilizing process conditions that simulate the continuous manufacturing process described in Example 1.

EXAMPLE 7

A vinyl latex froth foam having the following formula was prepared:

| Ingredients | Parts by Wgt. |
| --- | --- |
| Poly(vinyl chloride) Suspension Type | 180 |
| Alkyl Imidazolinium Monocarboxylate (Na Salt) Wetting Agent | 4 |
| Dioctyl Phthalate, Plasticizer | 70 |
| Aluminum Trihydrate, Fire Retardant and Filler | 150 |
| Ethylene Glycol, Drying Agent | 6 |
| Nonionic Water-Soluble Hydroxy Ethylcellulose | 8 |

The above ingredients were mixed thoroughly and frothed in an Oakes foamer. This foam was applied to a better saturated asbestos backing utilizing a knife coater to a foam thickness of 0.090 inch. The foam was fused in a hot-air oven maintained at 275°F. for a period of 5 minutes. This material was cooled, printed, and reheated to dry the inks. A 10-mil wet coating consisting of Formula 1C was applied to the sheet, fused, and cooled to room temperature. The vinyl wear layer surface was heated rapidly to 320°F. and embossed immediately with a cold steel 14 inch × 14 inch embossing plate in a flatbed press against 10-mil shims. The asbestos backing was kept below 150°F. The resulting sample had mortar line and surface texture embossing that was similar in depth and detail to those materials made under conditions of Example 1.

EXAMPLE 8

The following rubber latex foam formula was prepared by thoroughly mixing the following ingredients.

| Ingredients | Parts (wet) by Wgt. |
| --- | --- |
| Styrene-Butadiene Rubber (68% solids) | 147.0 |
| Potassium Pyrophosphate | 2.5 |
| Potassium Oleate | 2.5 |
| Ammonium Hydroxide | 0.9 |
| Aluminum Trihydrate | 75.0 |
| Calcium Carbonate | 75.0 |
| Cure Dispersion, ZnO, Ethyl Zionate, Sulfur (Wingstay L) | 9.6 |
| Octadecyl-Sulfo-Succinamate (Lubricant) | 5.0 |
| Pigments | 1.6 |

The above mixed formula was frothed in an Oakes foamer and applied to a heater saturated asbestos carrier using a knife coater to a thickness of 0.125 inch. The foam was fused in a hot-air oven maintained at 275°F. for a period of 6–7 minutes. The printing methods, application of 10 mils of vinyl wear layer, fusing, and embossing were carried out as in Example 7. A 14 inch × 14 inch hand sample was made having an embossed surface comparable to that made in Example 7.

EXAMPLE 9

A 60–80 pores per inch flexible polyester polyuethane foam having a thickness of 0.125 inch was adhered to a 0.028 inch stable coated beater-saturated asbestos backing. The foam is similar to those foams made under U.S. Pat. No. 3,025,200 and U.S. Pat. No. 3,425,890. In this particular case, a reticulated polyurethane foam was adhered to the backing using a thin coating of a 25% solid solution of a thermoplastic urethane adhesive. A 10-mil vinyl layer (Formula 1C) was applied to the opposite side of the foam, the foam becoming the intermediate layer. The face of the 14 × 14 inch hand sample was heated rapidly to 320°F. and embossed under the conditions of Example 7.

The resulting sample has a mortar line embossing depth of .010 inch and a surface texture embossing depth of 0.005 – 0.007 inches.

What is claimed is:

1. A floor covering material which is composed of a three-layer structure, the lower layer being a backing material, the intermediate full foamed layer being a flexible foamed thermoplastic or thermoset material, and the upper layer being a wear layer; the wear layer having an embossed pattern placed on the surface thereof, said embossed pattern being both surface texturing and deep embossing, said wear layer being greater than approximately 1/6 to 1/4 the thickness of the foam layer and being deeply embossed in depth approximately the thickness of the wear layer, the fully foamed intermediate layer in the region of the deep embossing having a substantially undamaged, but compressed, fully foamed, cell structure which is capable, upon reheating of the sheet material, of exerting sufficient stress upon the relieved wear layer to restore the wear layer to its unembossed state.

2. The floor covering material of claim 1 wherein the upper layer is composed of two parts, one part being a thin thermoset urethane top layer and the other part being a thicker thermoplastic layer, both parts being co-embossed in depth approximately the thickness of the total upper layer structure.

* * * * *